United States Patent [19]

Ropert

[11] 4,161,255
[45] Jul. 17, 1979

[54] DEVICE FOR DISCHARGING MATERIALS LYING UPON A STORAGE AREA

[76] Inventor: Claude P. Ropert, 1 Cité du Parc, Boîte Postale 46, 28240 La Loupe, France

[21] Appl. No.: 857,351

[22] Filed: Dec. 1, 1977

[30] Foreign Application Priority Data

Dec. 2, 1976 [FR] France .................. 76 36324

[51] Int. Cl.² .......................................... B65G 25/08
[52] U.S. Cl. ................... 414/323; 198/507; 198/748; 414/325
[58] Field of Search .......... 214/17 D, 17 DA, 17 DB; 198/301, 507, 718, 748; 254/173 R

[56] References Cited

U.S. PATENT DOCUMENTS

| 2,620,161 | 12/1952 | Royer | 254/173 R |
| 3,240,323 | 3/1966 | Kitson | 198/748 X |
| 3,944,086 | 3/1976 | Frisz et al. | 214/17 DA |
| 3,960,110 | 6/1976 | Laurenz | 119/28 |

*Primary Examiner*—Robert G. Sheridan
*Attorney, Agent, or Firm*—Young & Thompson

[57] ABSTRACT

For handling and more particularly for discharging materials lying in a pile upon a storage area like the bottom of a silo, a scraping element is driven into the pile of materials and the resisting force applied to said scraping element is measured. When the said force has reached a predetermined value, the direction of motion of the said scraping element is reversed in order to discharge an amount of materials from the silo. Means are provided to generate a control signal when the said value has been reached, said signal being applied to means for controlling the reversing movement of the scraping element. Thus the resistance encountered by the said scraping element and its driving means does not exceed an admissible value and no blocking can take place.

6 Claims, 5 Drawing Figures

DEVICE FOR DISCHARGING MATERIALS LYING UPON A STORAGE AREA

GENERAL DISCLOSURE

The present invention relates to a method for handling and more particularly for discharging materials stored in a pile upon a horizontal or slightly sloped storage area. It allows more particularly to remove, by successive stages, small amounts of raw materials lying upon the storage area and to discharge them towards a discharge spout or similar discharging means contiguous to said storage area.

The invention applies more particularly to flat-bottomed silos when it is desirable to discharge the residue of raw materials (such as grains, fruit and vegetables, spices, sand, gravel, cement, or the like) stored thereupon.

Complete emptying of a flat-bottomed or slightly inclined storage pit or silo has always presented some problems. When only small quantities of materials are remaining in the silo, they finally form a stationary pile upon the storing area corresponding to the bottom of the silo. In other words, there always comes a time when no more material can fall spontaneously into the discharge spout located at the edge of the area, though some material is still present inside the silo. Said material must then be discharged manually, which means, in the case of unsophisticated equipment, the necessity of entering the silo and shovelling out the residual materials. Some silos comprise mechanical equipment to perform that unpleasant task, but no really satisfactory one is presently known, as such discharging devices get frequently stuck once the discharging or scraping elements have penetrated into the pile of material.

One object of the invention is to cope with the aforesaid drawback.

According to known systems (French Pat. No. 438,299; U.S. Pat. No. 3,960,110,), materials are scraped out by a scraping tool. Such means are used, for instance, to discharge silos or solid or viscid manure in modern stables.

However, working conditions are different when a scraping tool must be pushed into a pile of materials and dragged back afterwards, so as to carry along a certain quantity of said materials or products, the same operation having to be repeated until complete discharge of the products lying upon the storage area.

It has been noticed that, in practice, when the scraping tool penetrates into the pile of materials or products, a resisting force arises and increases progressively as said tool drives in. This increment of the resisting force is the cause which finally makes the scraping tool jam.

The present invention is based upon the aforesaid remark and the fact that the amount of products discharged at each stroke of the scraping element is mostly dependent on its active cross-section, so that it does not increase noticeably above a certain value.

Consequently, one object of the invention is to provide a method for handling, more particularly for discharging products stored in a pile upon a horizontal or slightly inclined storage area, with discharging means contiguous to said area, by which method a scraping element is driven into the pile of products in a direction opposite to that of the discharging means, said scraping element being subsequently moved in the reverse direction so as to scrape a given amount of stored material up to said discharging means, said method being characterized in that during the driving-in motion of the scraping element into the pile of materials, the resisting force applied to said element is measured continuously, and when said force reaches a predetermined value, the motion of the scraping element is reversed so as to carry an amount of products back towards said discharging means.

Another object of the invention is to provide a handling device, more particularly for discharging products heaped on a pile upon a horizontal or slightly sloping storage area, particularly but not exclusively on the bottom of a silo, comprising a movable scraping element having a back-and-forth motion over said area, means for driving said scraping element back and forth and discharging means for said products, contiguous to said area, said device being characterized in that it comprises means for measuring the resisting force applied to the scraping element while it is driven into the pile of products, control means generating a triggering signal when said force reaches a predetermined value and a motion reversing device reacting to said signal and connected to driving means to operate the scraping element so as to reverse its sense of motion and to trigger off its run towards said discharging means when said signal is generated.

Following description, together with appended drawings will permit a better understanding of the invention.

Figure 2:
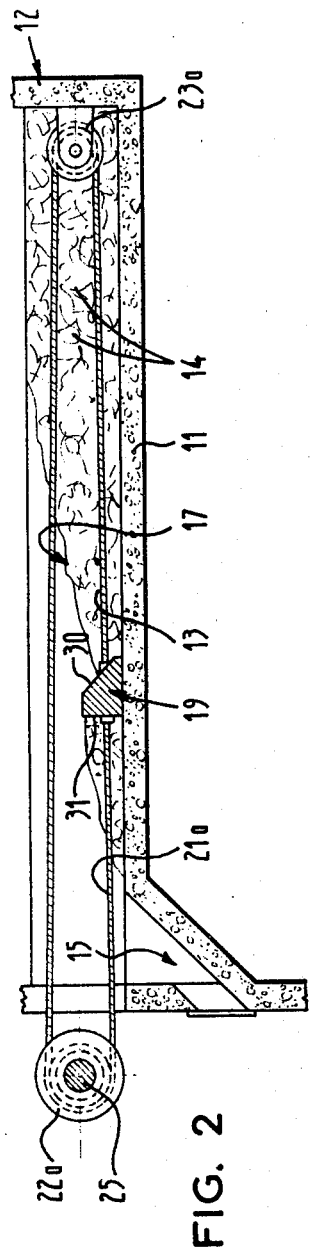
FIG. 2 is a sectional view along line II—II of FIG. 1.
Figure 1:
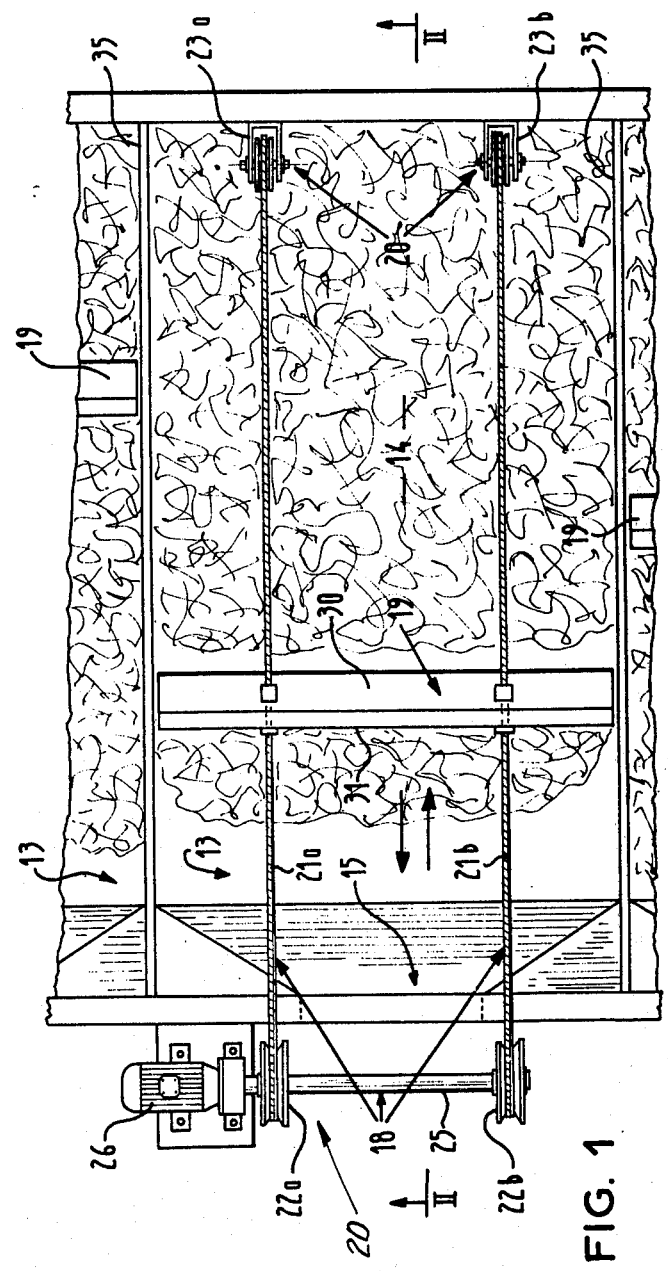
FIG. 1 is a plane view representing a part of the bottom of a silo, shown almost empty, with a device according to invention for moving the residual raw materials towards the discharging spout of said silo.

Referring to FIGS. 1 and 2, the flat bottom 11 of a silo 12 is shown to form a storage area 13 for storing raw materials 14. A discharging spout 15 is disposed at the edge of said storage area. As it appears clearly in the drawings, silo 12 is almost empty (which can happen sometimes according to the operating conditions), so that the small amount of materials contained in it forms a pile 17, stationary upon the storage area, which can not be discharged through spout 15 without a special intervention. In order to met this shortcoming, the bottom of the silo is equipped with a handling device 18 for discharging the raw materials, comprising a scraping tool 19, (a kind of plane tool with a trapezoid-shaped cross-section), movable in translation following a back-and-forth motion as described hereafter, owing to a double winch system 20 including, in the example shown, two hauling cables $21_a$ and $21_b$ respectively, stretched between two pairs of return sheaves $22_a$, $23_a$ and $22_b$, $23_b$. Sheaves $22_a$ and $22_b$ are powered, said sheaves being integral with the rotating shaft 25 of an electric motor 26 which forms, together with the aforementioned winch system, the driving means for the scraping element 19. Cables $21_a$ and $21_b$ are wound twice around the driving sheaves so as to provide a correct transmission. As shown in FIG. 2, cables $21_a$ and $21_b$ run through the scraping tool 19. They are rigidly fixed on it, so that said scraping tool 19 can move back and forth over the storage area 13 when the motor 26 is powered.

The shape of said tool 19 has its importance too. The drawings show that it consists of a rigid bar whose profile is tapered towards the pile 17 (part forming an incline 30), while part 31 of said profile is upright towards the discharge spout 15. So the back-and-forth motion of said rigid bar is "sweeping up" the storage area 13.

It may equally be noticed that FIG. 1 represents only a part of the bottom of silo 12, said bottom being divided into a plurality of parallel corridors separated by partition walls 35 and having separate discharging spouts similar to 15. Each corridor may, of course, be equipped with a device 18, as shown in FIG. 1, but it is obvious for the skilled man that in such a case it will not be necessary to set up a plurality of driving motors like 26. It is easy to devise a more complete transmission system allowing to drive all the devices like 18 equipping the whole silo by conveying to them the adequately powered output of one single motor.

Figure 4:
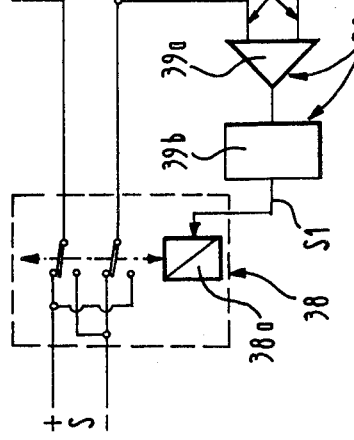
FIG. 4 is an electric diagram for the feeding system of the motor driving the handling device according to FIG. 1 or 3, comprising a system for reversing the running direction of said handling device.

Control of motor 26 is one important characteristic of the present invention. Referring to FIG. 4, motor 26 (which is in the present instance a d.c. motor) is connected to a voltage source S through an output reversal system 38 (consisting mainly of a bi-polar relay adequately wired so as to revert the voltage feeding the motor 26) and to a means for measuring the resisting force applied to the scraping tool, said means comprising here a shunt 40 mounted in series on the feeding circuit of the motor 26. As shown in the diagram of FIG. 4, a control means 39 has its differential sensing inputs e connected to the respective terminals of shunt 40, its output $S_1$ being connected to one input of the reversal device 38. Said control means 39 may comprise a differential comparator 39a and an amplifier 39b, both being adjusted so as to switch over to a given electric state as soon as the voltage drop between the terminals of shunt 40 reaches a predetermined value and to deliver to the relay 38a of the reversal device a triggering current, strong enough to revert its contacts, which reverts at the same time the polarity at the terminals of motor 26. It is obvious, however, that such a circuit may include a number of modifications and improvements. Thus, control means 39 could comprise a time-delay circuit in order to delay transmission of its control signal to said reversal device.

Figure 5:
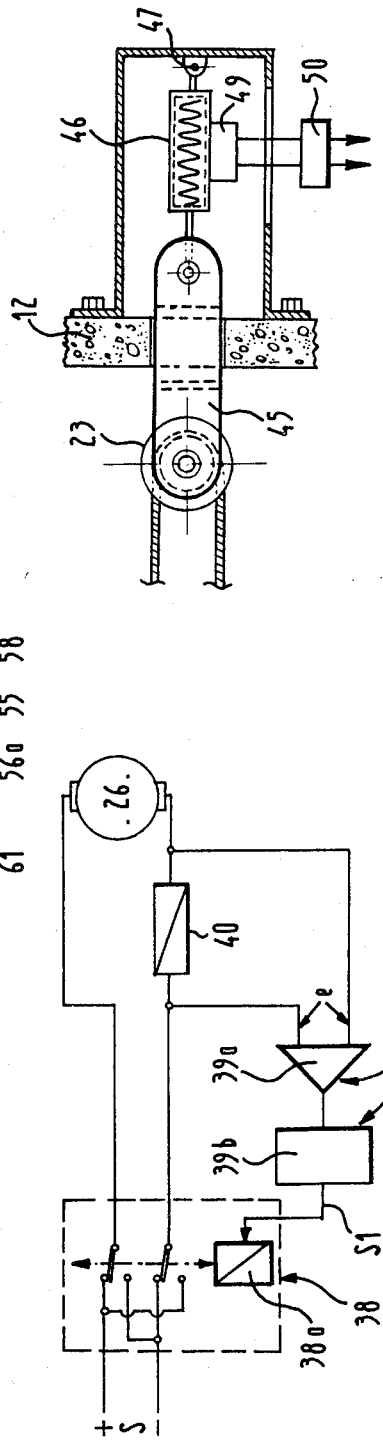
FIG. 5 shows another embodiment of a part of the reversal system in FIG. 4.

The structure of the control means of motor 26 may undergo important changes without departing from the scope of the invention. For instance, FIG. 5 shows one possible alteration which allows to eliminate shunt 40. According to said embodiment, one of the idle guide sheaves 23 is linked, over an idle fork 45, to one end of a dynamometric sensor 46 whose other end is rigidly attached to a fixed point 47 of silo 12. In the example shown by FIG. 5, sensor 46 is favourably located in a housing disposed outside of silo 12, while the fork 45 passes through the wall of the latter. This arrangement gives the discharging device according to invention a range including the whole length of storage area 13, because return sheave 23 is always located very close to the outer wall of silo 12. An electric switch 49 is mechanically coupled with the dynamometric sensor 46 in order to switch over when said sensor has undergone a distorsion (elongation) to a predetermined value. After passing through a time-delay circuit 50, the electric control signal generated by switch 49 can be applied directly to a reversing device similar to that shown in FIG. 4.

The device according to the invention works very simply, its operating mode being easily understood from the preceding description. At the beginning, scraping tool 19 is driven into the pile of materials 17, through the motor 26. The resisting force applied to said tool 19 increases, however, progressively as it penetrates the pile, said force being permanently checked either by the voltage drop in shunt 40 (as motor 26 absorbs an increasing amount of current), or by distorsion of the dynamometric sensor 46. At a given instant, said resisting force reaches a chosen limit value; a control signal is then generated, either by inversion of the comparator 39a or by action on the switch 49, and said signal is transmitted to the reversal device 38, which triggers off the reversal of the running direction of motor 26. From then on, scraping tool 19 runs backwards and carries along part of the stored material towards the spout 15. As soon as tool 19 abuts the lateral enclosure of silo 12 near the spout 15, the limit value of resistance triggering off the signal to reverse the running direction can be reached quite instantly, so as to induce another reversal of motor 26, starting off once again the tool 19 towards the pile of raw material 17. However, it is also possible to provide limit-switches at the end of the tool's stroke, said switches (not shown) ensuring the same function without inducing an excessively sharp stop of motor 26.

Figure 3:
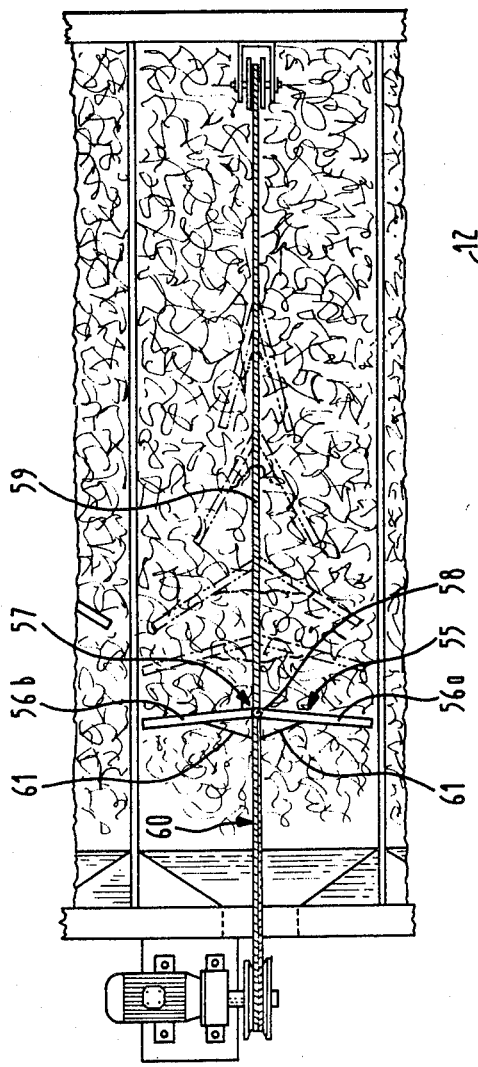
FIG. 3 is a view similar to FIG. 1, showing another embodiment of the handling device.

FIG. 3 shows an alternative of the handling device according to the invention, more particularly another embodiment of the scraping tool. The latter has here a variable geometry. According to the nature and the grain-size distribution of the materials stored in the silo, it can be better to use such a structure instead of that shown in FIGS. 1 and 2. In such a case, the scraping tool 55 is made up essentially of two panels $56_a$, $56_b$ linked together by a hinge 57 around a common pin 58 attached to the cable 59 of a single winch system 60, similar to the former one. At the same time, scraping tool 55 is provided with a locking means which keeps it in a widely open position, said means consisting here of two holding cables 61 respectively fixed to each panel $56_a$, $56_b$ and to cable 59 at a point 62 of the latter located between the discharge spout 15 and pin 58. The widely open position aforementioned is shown in full lines in FIG. 3, both panels being nearly coplanar.

When the scraping tool 55 is driven into the pile of material, both panels tend to fold back, giving the tool a more and more penetrating shape (successive positions are shown in FIG. 3 by phantom lines). However, there is always a moment when the resisting force applied to the scraping tool 55 reaches the predetermined critical value. The reversal system of the motor is then triggered off and the scraping tool runs backwards to spout 15, resuming its spread-out shape determined by the outstretched position of the holding cables 61.

What is claimed is:

1. In a device for handling and more particularly for discharging materials or products lying in a pile upon a horizontal or slightly sloped storage area, comprising a movable scraping element, a reversible winch system comprising at least one hauling cable and sheaves and a motor for said winch system, means for reversing the movement of said winch system for driving said scraping element in a back-and-forth movement on said storage area and discharging means contiguous to said storage area; the improvement comprising means for measuring the resisting force exerted on said scraping element while said element is moved into said pile of material, means for setting a predetermined value of resisting force, control means for generating a controlling signal when said resisting force reaches said predetermined value, and means for connecting said reversing means to said control means upon said controlling signal being transmitted for reversing the direction of movement of said winch system and consequently of said scraping element for discharging material from said pile of material.

2. A device according to claim 1, wherein said motor is a reversible motor and said control means is connected to said motor for reversing the direction of movement of said motor and consequently of said scraping element for discharging material from said pile of material.

3. A device according to claim 2, wherein said means for measuring the resisting force exerted on said scraping element comprises a shunt or the like and the motor has a feeding circuit, and said shunt or the like is series connected in said feeding circuit of said motor for its reversal.

4. A device according to claim 3, wherein said control means comprises a comparator-amplifier circuit so adjusted as to switch over to a given electric state when the voltage drop between the ends of said shunt reaches said predetermined value, whereby said controlling signal is generated for reversing the direction of movement of said motor and consequently of said scraping element.

5. A device according to claim 2, wherein said means for measuring the resisting force exerted on said scraping element comprises a dynamometric sensor, and a reversing electric control switch is mechanically coupled with said dynamometric sensor so as to be reversed by said sensor when said predetermined value of resisting force has been reached, said switch being interposed in the circuit of said motor.

6. A device according to claim 1, wherein said means for measuring the resisting force exerted on said scraping element comprises a return sheave, a fork or like support, said return sheave being mounted on said fork, a frame having at least one fixed fastening point, and a dynamometric sensor arranged between said fork and said fixed fastening point, and said driving means comprises a winch system having at least one cable, said cable extending around said return sheave.

* * * * *